United States Patent
Kallman et al.

(10) Patent No.: US 11,809,508 B1
(45) Date of Patent: Nov. 7, 2023

(54) ARTIFICIAL INTELLIGENCE GEOSPATIAL SEARCH

(71) Applicant: Geodex Inc., Atlanta, GA (US)

(72) Inventors: Jesse Daniel Kallman, Atlanta, GA (US); Martice Eldridge Nicks, III, Sarasota, FL (US)

(73) Assignee: Geodex Inc., Atlanta, GA (US)

( * ) Notice: Subject to any disclaimer, the term of this patent is extended or adjusted under 35 U.S.C. 154(b) by 0 days.

(21) Appl. No.: 18/210,544

(22) Filed: Jun. 15, 2023

(51) Int. Cl.
| | |
|---|---|
| *G06F 16/00* | (2019.01) |
| *G06F 16/9537* | (2019.01) |
| *G06F 40/30* | (2020.01) |
| *G06F 40/40* | (2020.01) |
| *G06F 16/951* | (2019.01) |

(52) U.S. Cl.
CPC ........ *G06F 16/9537* (2019.01); *G06F 16/951* (2019.01); *G06F 40/30* (2020.01); *G06F 40/40* (2020.01)

(58) Field of Classification Search
CPC .... G06F 16/9537; G06F 16/951; G06F 40/40; G06F 40/30
See application file for complete search history.

(56) References Cited

U.S. PATENT DOCUMENTS

| | | | | |
|---|---|---|---|---|
| 11,263,268 | B1* | 3/2022 | Bourbie | G06F 16/2228 |
| 11,366,866 | B2* | 6/2022 | Agrawal | G06F 16/9024 |
| 11,573,955 | B1* | 2/2023 | James | G06F 16/2228 |
| 2018/0052885 | A1* | 2/2018 | Gaskill | G06N 5/04 |
| 2018/0357278 | A1* | 12/2018 | Moustafa | G06F 16/9024 |
| 2022/0138170 | A1* | 5/2022 | Misiewicz | G06N 3/045 |
| | | | | 707/737 |

FOREIGN PATENT DOCUMENTS

| | | | |
|---|---|---|---|
| CN | 104834668 A | * | 8/2015 |
| CN | 110443571 A | * | 11/2019 |
| CN | 114491079 A | * | 5/2022 |

\* cited by examiner

*Primary Examiner* — Leslie Wong
(74) *Attorney, Agent, or Firm* — Cognition IP, P.C.; Edward Steakley; Saleh Kaihani

(57) ABSTRACT

An artificial intelligence (AI) search system can build or include one or more knowledge graphs and databases of indexes. The knowledge graphs can encode information and relationships from a variety of domains. The databases of indexes can store pointers to public and/or private data and raw content in those domains. An example of a domain includes fields requiring or handling geospatial data. The AI search system can receive a user query and process the query with AI models, including language models and knowledge graphs to identify data matching the intention and context of the user query. The AI search system can present relevant results in an assortment of user interfaces.

20 Claims, 11 Drawing Sheets

ARTIFICIAL INTELLIGENCE GEOSPATIAL SEARCH

BACKGROUND

Field

This invention relates generally to the field of programmatic and computer-based searching, and more particularly to systems and methods for geospatial search using artificial intelligence techniques.

Description of the Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Many areas of life relate to or in some way concern location-based or geospatial data. Private businesses, and government entities alike, spend substantial resources in searching, organizing and analyzing geospatial data for military, intelligence, or business purposes. While some sources of geospatial data are in private communication networks of government or corporations, many sources of useful geospatial data also exist in the public domain and open-source environments. Government or private sector analysts research and review both public and private geospatial data to make government or business decisions. In many cases, the existing tools return a trove of documents, containing millions of results, to a geospatial analyst, making it difficult to draw conclusions or perform analysis. A substantial amount of an analyst's time is spent reviewing voluminous search results to obtain a more tailored response to a government or business question. As a result, there is a need for more robust geospatial search tools to provide the users with more relevant and narrow datasets in an easy-to-digest format. Furthermore, the analyst can benefit from a robust search system that allows the analyst to enter a simple query in natural language and obtain relevant and tailored information.

SUMMARY

The appended claims may serve as a summary of this application.

BRIEF DESCRIPTION OF THE DRAWINGS

These drawings and the associated description herein are provided to illustrate specific embodiments of the invention and are not intended to be limiting.

FIG. 7 illustrates an example of a user interface that can be generated based on the result of running a query through an example geospatial online search system according to an embodiment.

DETAILED DESCRIPTION

Figure 1:
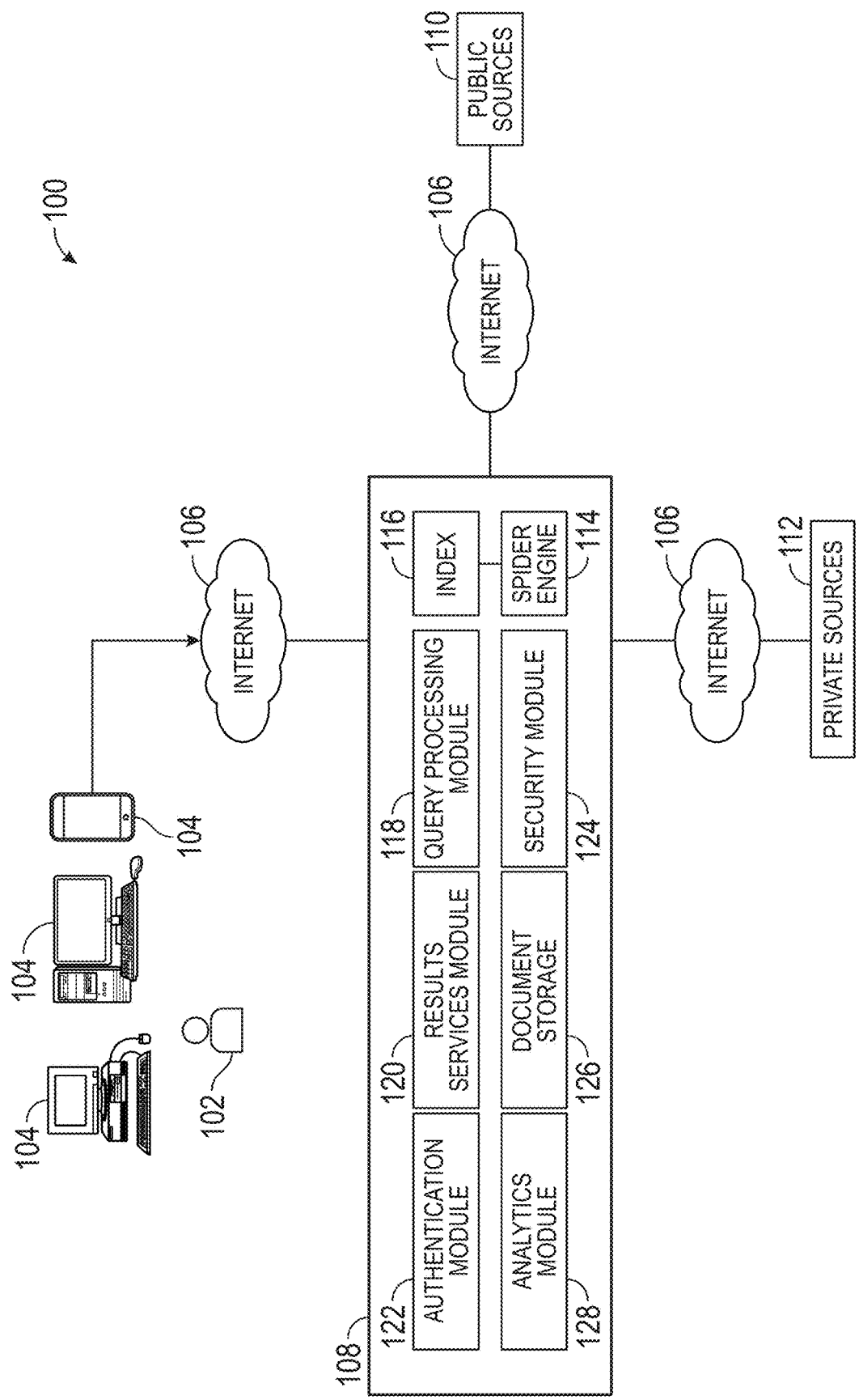
FIG. 1 illustrates an environment of a geospatial online search system according to an embodiment.

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

The advent of artificial intelligence (AI) has opened doors for more automation and availability of better tools in many industries. The field of online search can also benefit substantially from AI tools, in particular AI-based language models can provide additional convenience, efficiency and accuracy to the field. In particular, modern AI tools can help better understand a user's query, in terms of context, semantics, timelines of interest and other attributes and can serve more accurate and tailored results. For example, the users of the described embodiments can pose simple questions, termed "query" or "queries," in a human language, and receive tailored responses. In particular, several embodiments can be used in the field of geospatial research, where the user is interested in performing research on topics with some connection with a point or an area on earth.

Several entities can benefit from a robust geospatial online search system. For example, governmental entities may be interested in performing geospatial online research for military or strategic reasons. Some government agencies utilize geospatial analysts to research and answer queries related to military or strategic objectives. In many cases, these queries are related to or tied to locations or coordinates on earth. For example, some geo-analysts' queries may be related to the Russo-Ukrainian war, and to the regions, where the conflict is underway. A sample query, for example, can be "Is there a build-up of tanks in the Eastern Ukraine?"

In commercial applications, various entities can also use a robust geospatial online search system to look for answers to questions that relate to a location. For example, real-estate businesses can utilize a geospatial online search system to research queries that inform real estate investment or development activities. A sample query for a real estate development firm, for example, can be "What are undeveloped areas in the State of Vermont with commercial zoning allowance that are near residential apartment buildings?" Similarly, individuals or small businesses can also benefit from a robust geospatial online search system. A sample query for a renovation property investor can be "how old is the roof at 123 Main St.?"

FIG. 1 illustrates an environment 100 of a geospatial online search system 108 according to an embodiment. The user 102 can use a variety of computing devices 104 to access the system 108 via the Internet 106, pose a query and receive results. The user 102 can be an individual, who maintains an account with the geospatial online search system 108 or can be an employee or an agent of an organization that maintains an account with the system 108. The geospatial online search system 108 can utilize both public sources 110 and private sources 112 to prepare indexes to content that may be of interest to users 102. The public and private sources 110, 112 can be any source that provide any location-based, coordinate-based, or geospatial data. Example sources 110, 112 can be found in online databases or websites that are designed specifically to provide geospatial data, but also in sources that may not be specifically directed to standardized or non-standardized geospatial data. For example, geospatial data can be found in websites that provide spatiotemporal asset catalog or STAC-compliant data (e.g., https://stacindex.org/). Geospatial data can also come from any corner of the Internet, including general websites, social media, blogs, video websites, etc. While some embodiments are described in relation to online searching for geospatial data, several embodiments have general or specific application for searching in other fields, not limited to geospatial data searching.

In some embodiments, the geospatial online search system 108 utilizes a spider engine 114 to build an index 116. The index 116 can be prepared prior to receiving a query from the user 102, concurrently, or can be further improved in relation to one or more past queries from the users 102. The query processing module 118 can include a plurality of submodules to receive a user query and perform operations to extract semantics, context, timelines, and other attributes of the query and find one or more relevant indexes to provide to the user 102. A results services module 120 can generate the UI elements of the UI 100 and provide the results of the user query to the user 102.

The geospatial online search system 108 can also include an authentication module 122 to store the credentials of the user 102. The credentials can include access credentials of the user to authenticate access, type of access and access plan under which the user 102 can utilize the services of the geospatial online search system 108. The credentials can also include any security clearances under which the user 102 is allowed to access private and/or classified data. In some embodiments, the geospatial online search system 108 can be configured to provide results, based on the user's credentials, including any security clearance restrictions. The authentication module 122 can be implemented in more than one module depending on the implementation. The geospatial online search system 108 can include a security module 124, which can store security attributes of data found in private sources 112 and apply them to the index 116. In the cases where the user 102 belongs to an organization, which subscribes to the services of the geospatial online search system 108, the security module 124 can store the credentials of the users 102 as they are defined by an umbrella organization. Some users 102 within the same organization can have superior access to content in the private sources 112 than other users 102 within the same organization. Furthermore, the security module 124 can store and apply access credentials for an organization, when a private source 112 is a third-party or vendor of the organization subscribing to the services of the geospatial online search system 108.

The geospatial online search system 108 can be configured to provide an index of search results to the user 102. The index, or results that include an index, can include metadata pointing to a source, where the user can obtain the content to which the index points. In some embodiments, the results services module 120 accesses the source and displays the content in the source in one or more user interfaces to user 102. In some embodiments, the geospatial online search system 108 can include a document storage 126, configured to store indexes 116 or the contents to which the indexes 116 point. The user 102 can also use "collections" and download content into an allocated storage space for the user.

Geospatial data can sometimes be the subject of various analytics reports to extract insight from the data. Vendors can generate analytics reports based on a set of geospatial data. For example, geospatial analytics can be used to generate predictions from the data, or build data visualizations, such as maps, graphs, or generate statistics, cartograms, trends, etc. The user 102 or an umbrella organization of the user 102 can have access to geospatial analytics report vendors or can generate such analytics in-house. The geospatial online search system 108 can include an analytics module 128, which can detect a relationship between results produced in response to a user query and outline the relationship in the results, for example, with a user interface element. In some embodiments, the index 116 can be enriched with available analytics, such that any results returned to the user can also include available analytics, including any analytics vendor, which can run analytics using the query results. In some embodiments, the geospatial online search system 108 can introduce the user 102 to vendors or potential analytics report sources matching the user's geospatial data. In other words, the geospatial online search system 108 can flag a potentially useful analytics report generator, which the user 102 can choose to run.

Figure 2:
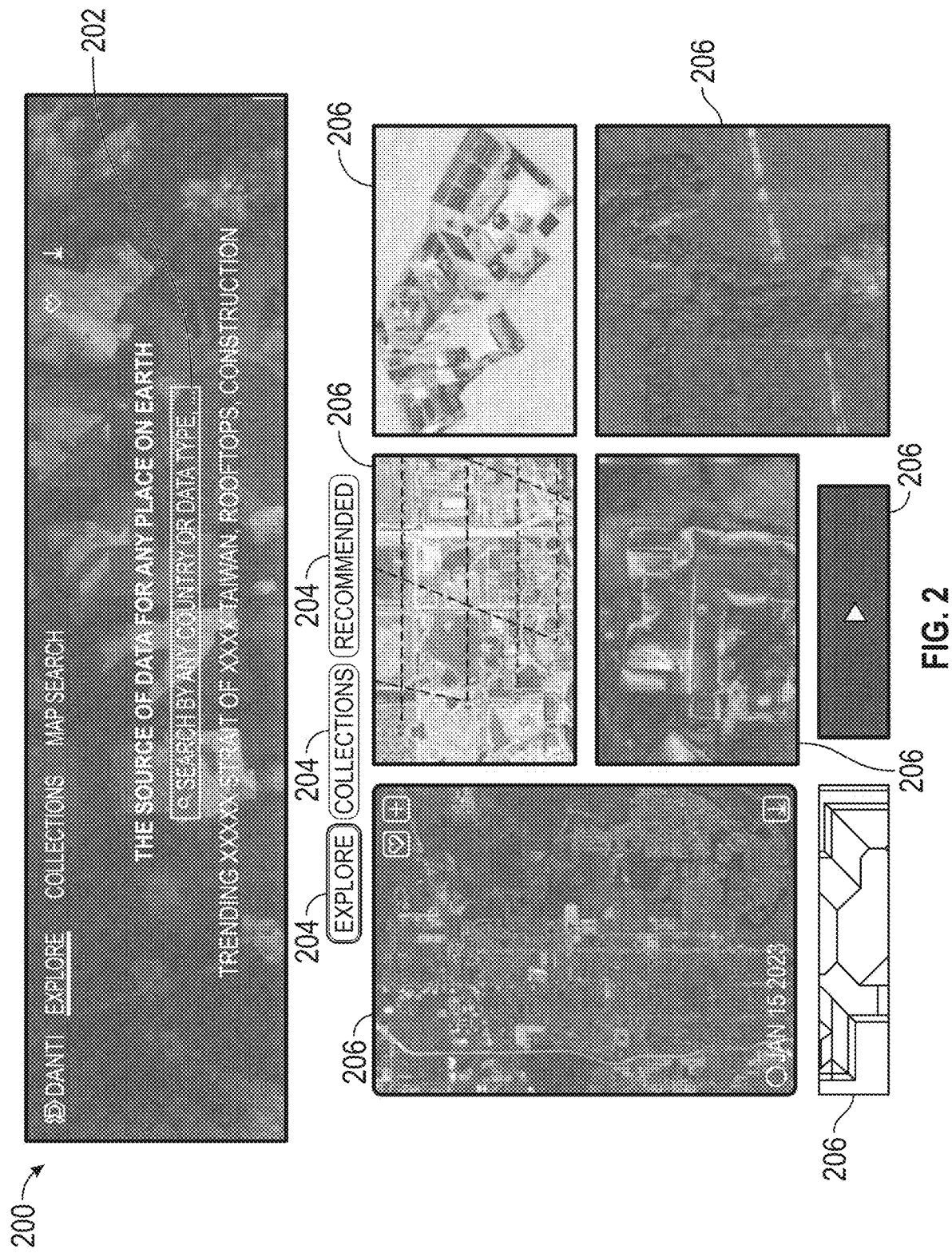
FIG. 2 illustrates a snapshot of a display of a user interface (UI) with which a user can access a geospatial online search system according to an embodiment.

FIG. 2 illustrates a snapshot of the display of a user interface (UI) 200 with which a user 102 can access a geospatial online search system 108. The UI 200 can be accessed in a variety of ways, including with a desktop or mobile browser accessing a URL of the geospatial online search system. The UI 200 can also be part of a desktop or mobile application. The user 102 can pose a query to the geospatial online search system 108 with a search bar 202. The user 102 can enter a query in natural language into search bar 202. The query does not have to be grammatically correct or precise for the geospatial online search system 108 to interpret the query and return relevant results. While a home screen is shown, the UI 200 can present different screens and ways for the user 102 to interact with the system 108. In the sample UI 200 shown, there are options for the user 102 to sign up for the services of the geospatial online search system 108, favorite and download content.

The UI 200 can also include interaction modes 204 for the user 102 to interact with the geospatial online search system 108. In one embodiment, the interaction modes are "explore," "collections," and "recommended." In each interaction mode, the geospatial online search system 108 can present different interactive elements, depending on the query, results of the query, user's account, previous queries of the user and other elements.

Figure 3:
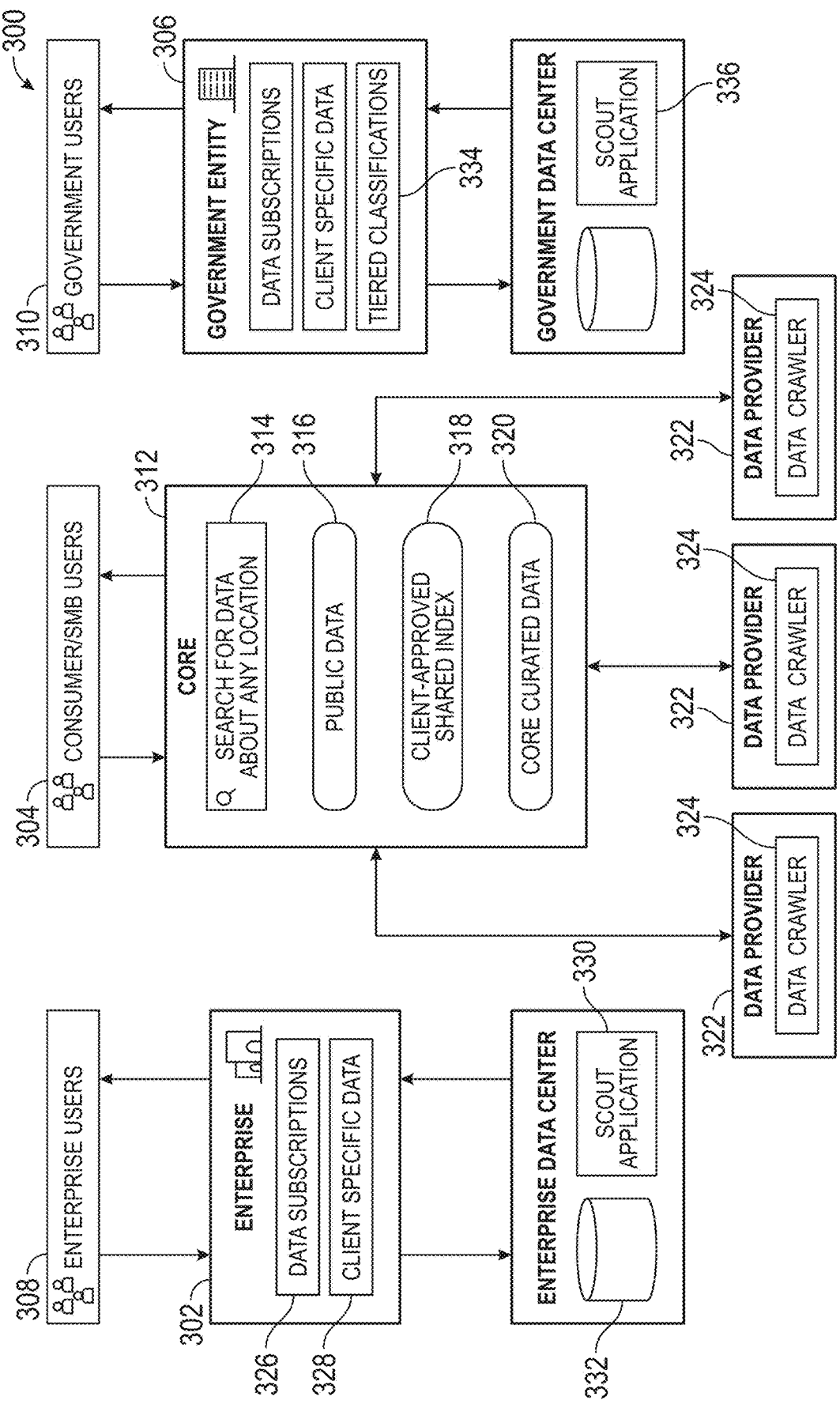
FIG. 3 illustrates a diagram of an example deployment of a geospatial online search system according to an embodiment.

FIG. 3 illustrates a diagram 300 of an example deployment of the geospatial online search system 108. Clients of the geospatial online search system 108 can include enterprise 302, consumers or small business (SMB) users 304 and government entity 306. The enterprise 302 can in turn have enterprise users 308, who are given access and credentials to use the geospatial online search system 108. The government entity 306 can have government users 310, who are given access and credentials to use the geospatial online search system 108. The enterprise 302 can have data subscriptions 326 to one or more third-party data providers 322. The enterprise 302 can also have client-specific data 328. For example, the enterprise 302 can maintain an enterprise datacenter, having one or more databases 332. In this scenario, the geospatial online search system 108 can run one or more scout applications 330 in the enterprise datacenter and in the databases 332 to build a dine-specific index of the client data. Similarly, the government entity 306 can have data subscriptions to third-party data providers 322, as well as government client-specific data. The government entity 306 can also maintain a government datacenter and internal or cloud-based databases. The government entity 306 can also have tiered classifications 334, which outline the security clearances required for accessing the data in the government datacenter. The geospatial online search system 108 can run one or more scout applications 336 in the government datacenter to build government client-specific indexes for a government entity 306. The geospatial online search system 108 can use the tiered classifications 334 to add security enrichment attributes to the indexed government data. When a query is run against the government indexes, the security enrichment attributes can be used in a knowledge graph and/or query planner to tailor which indexes can be returned as results, based on the security clearances of the user running the query. The same or similar security enrichment can also be applied in the non-governmental, or enterprise environment.

The geospatial online search system 108 can include a core 312, which allows a user to search for data about any location, via a user interface element, such as the UI element 314. The core 312 can access several sources to build one or more knowledge graphs and indexes against which a user query can be executed. For example, the core 312 can interface with multiple data providers 322 via data crawlers 324 to build one or more knowledge graphs and/or index databases. In some embodiments, the core 312 builds knowledge graph(s) and/or index databases, not necessarily in response to a particular query. In these scenarios, the knowledge graph(s) and index databases can be built before a user enters a query in the UI element 314. In some embodiments, a user query can trigger a change in the priority or in the order of data crawling, building and/or updating of a knowledge graph and/or index. For example, if it is detected that a user query relates to databases that are not yet indexed, but are in the queue for being indexed, those yet-unindexed databases can be moved up in the indexing priority queue.

The core 312 can build one or more indexes and/or index databases based on public and/or private data. These indexes can be generally applicable to multiple clients of the geospatial online search system 108, in which case, the indexes are based on public data, or the indexes can be client-specific, based on public and/or private data. For example, the core 312 can maintain public data 316, which can include indexes to public data, client-approved shared indexes 318 and core curated data 320, which can include indexes to core curated data applicable to a variety of clients and based on public data.

Figure 4:
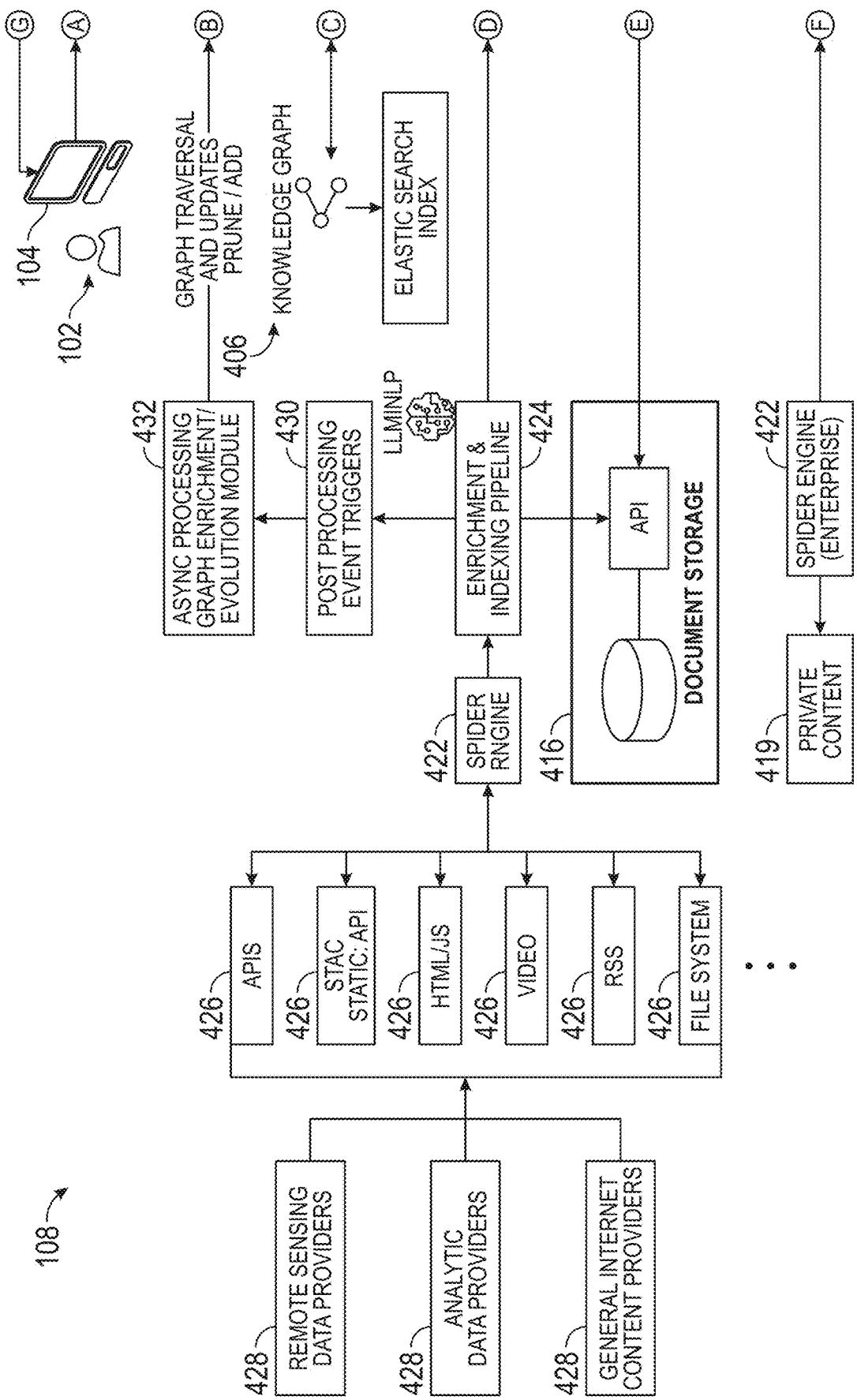
FIG. 4 illustrates a diagram of an example geospatial online search system according to an embodiment.
Figure 4:
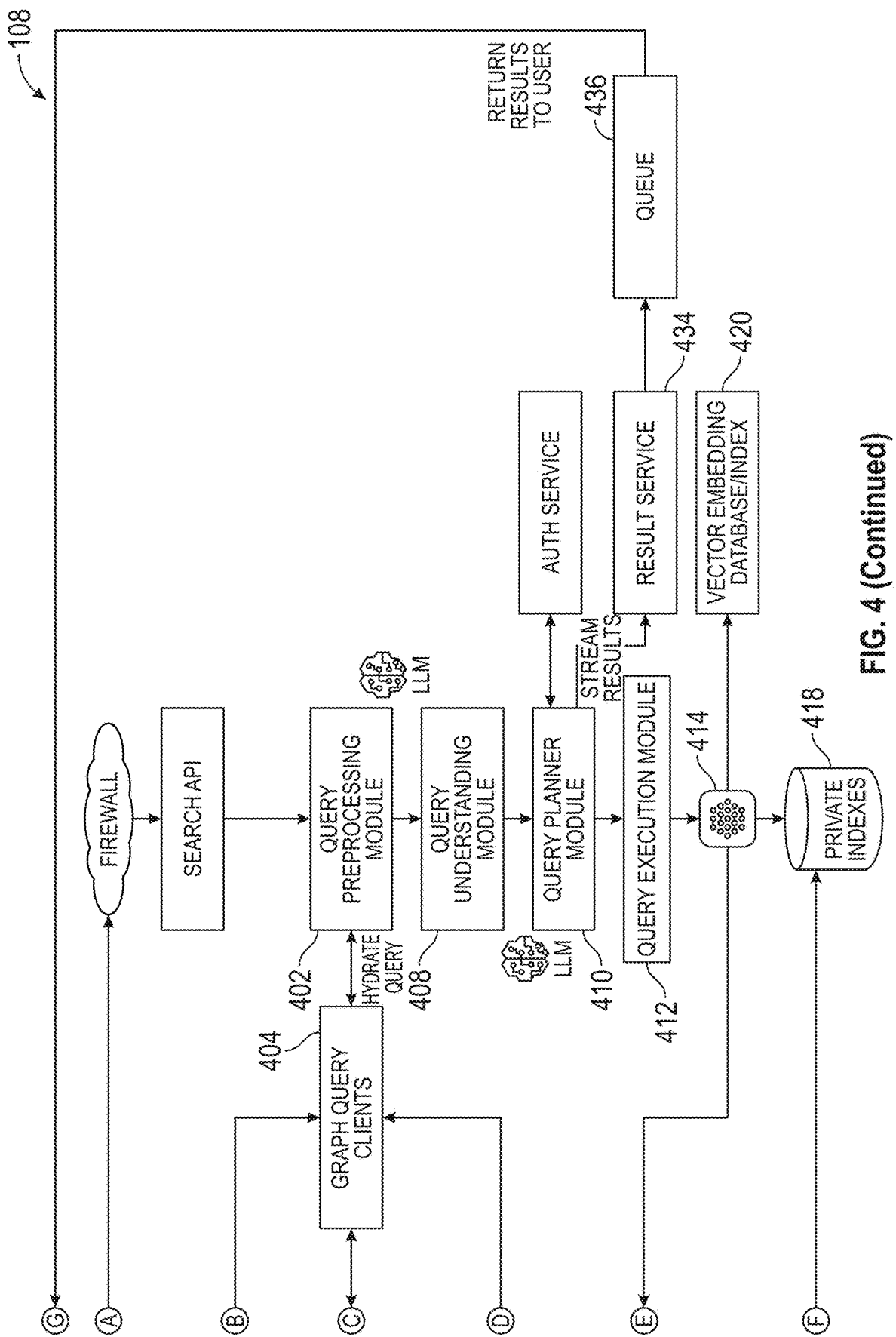

FIG. 4 illustrates a diagram of an example geospatial online search system 108. The user 102 can access the geospatial online search system 108 through one or more firewall and communication gateways. A query preprocessing module 402 receives a query from the user 102. The user query can be received in the form of a text string. The user can enter a natural language prompt to the geospatial online search system 108. In other words, the geospatial online search system 108 can receive an unstructured query. The query preprocessing module 402 receives the unstructured user query and generates a structured user query. Structured query can include labels and classifications of the user query. For example, the structured query can include parts-of-speech labels, classification of words labels, subject labels, topics labels, context labels, location labels, including for example, coordinates, areas or regions, timing labels, topics of interest, analytics reports of interest, entity names, address labels, etc.

In some embodiments, the query preprocessing module 402 can be implemented with language models, including for example, large language models (LLMs), natural language processing (NLP) models, or a combination of one or more language models. The NLPs can be implemented with smaller models and can efficiently return query labels for a received query. When the NLPs do not return labels for a query, one or more LLMs, which can be more resource intensive and more time consuming, can be deployed. Furthermore, the LLMs can be used to train the NLPs, to improve their performance in detecting labels for future queries. The preprocessing module 402 can also interface with graph query clients 404 and a knowledge graph 406 to generate the structured query.

The structured query is received by a query understanding module 408. The query understanding module 408 maps the structured query to a root query. The root query is a representation of similar queries. The geospatial online search system 108 can receive multiple semantically similar queries from one or more users 102. The root query can be used to handle and improve searching for multiple queries that can be directed to similar searches. In one embodiment, the query understanding module 408 can map the structured query to a root query using vector space embeddings for the queries. Queries having similar vector space embeddings can be mapped to a shared root query.

A query planner module 410 can receive the structured query and/or the root query and can generate various query pathways for the query. For example, the query planner module 410 can plan query pathways for the query to be sent to graph query clients 404 interfacing with the knowledge graph 406, private and/or public relational or vector-space embedding databases and/or indexes. A query execution module 412 can send the structured and/or the root query through the query pathways generated by the query planner module 410. In some embodiments, an authorization module 414 can additionally direct the query based on authorization and access attributes of the user 102. For example, in the context of governmental agency searches, users 102 can have differing levels of access, where users 102 can have a specified list and levels of classified data they can or cannot access. Similarly, for commercial or enterprise clients, some users 102 may have predefined access and authorization attributes. The authorization module 414 can direct the query based on the user's authorization attributes, avoiding searching sources and deploying system resources that might return results which the user may not be authorized to receive.

Query execution 414 can send the query to the graph query clients 404, knowledge graph 406, and/or multiple backend databases, database management systems, indexes, and/or APIs, depending on the query pathways. For example, the query (structured query and/or the root query)

can be sent to the graph query clients 404, and knowledge graph 406, where the query is queried on the graph 406. The query can also be sent to and queried against the document storage 416. In some embodiments, the document storage 416 can include a public relational database, indexes of the content in the database or APIs for accessing the database and/or a database management system. In other words, in some embodiments, the content of the databases from public or private sources are not stored within the geospatial online search system 108; instead, APIs or indexes are queried with the query. Postgres is an example of a relational database management system that may be queried against the query. A STAC API is an example of an API of a geospatial data source that may be queried against the query. A spider engine 422 can also generate private indexes 418, from client private content 419. The private indexes 418 can also be used when executing a query.

The document storage 416 can include a database of indexes of geospatial data accumulated by a spider engine 422 and an enrichment & indexing pipeline 424. The spider engine 422 can be configured to interface with various data sources 426 on the Internet or in a private communication network. The spider engine 422 can visit various data sources 426 and index geospatial and geospatially related data. The term "visit" is used to indicate an embodiment, where the spider engine 422 does not store the content in a database of the geospatial online search system 108; instead, it assists in generating an index or pointer of where the content is stored. Example data sources 426 a spider engine 422 can visit, include data sources that provide an application programming interface (API), geospatial data sources, such as STAC-compliant data providers, regular HTML/JS sources, video websites, really simple syndication (RSS) feeds, private file systems and others. In some embodiments, the spider engine 422 determines whether the visited data is geospatially relevant to potential user queries in the past or future and can index the geospatially related data.

The indexes can be stored in the document storage 416. The indexes can include metadata pointing to the source of data or content. For example, an index can include a uniform resource locator (URL) to raw data in a data source 426. The data sources 426 can receive their data or can generate data. For example, data sources 426 can receive data from sensors, remote sensors, monitors, analytic data providers, news organizations, survey and mapping organizations, satellite imagery, or from any source which generates data, including geospatial data, and places them in a public or private communication network. The geospatial online search system 108 can access private communication networks for indexing when an individual, enterprise or government client of the geospatial online search system 108 grants access credentials to the geospatial online search system 108.

The enrichment and indexing pipeline 424 can run the data visited or retrieved by the spider engine 422 through the graph query clients 404 and the knowledge graph 406 to enrich the index with semantic, relationships, types, formats, contextual or any other enrichment data returned by the knowledge graph 406. In this manner, enriched indexes can be stored in the document storage 416. Query execution 412 can query against an enriched index, returning more relevant and accurate results. The enrichment & indexing pipeline 424 can send the enriched index to post processing event triggers 430 and asynchronous processing graph enrichment and evolution module 432. The triggers 430 and the evolution module 432 can update the knowledge graph 406, based on some events. For example, some data sources 426 may update their data. In some embodiments, the spider engine 422 and/or the enrichment indexing pipeline 424 can detect a frequency of update to an index. For example, periodical data update or unscheduled data modification in a data source 426 can be detected and a corresponding index in the document storage 416 can be updated. Some changes in data can also trigger update events for the knowledge graph 406.

The geospatial online search system 108 can utilize a multiphase enrichment approach to building up more refined search results. For example, in a first phase, the structured query can be searched against a plurality of sources to generate a first set of results. In a second phase, in parallel to the first phase, iteratively or in steps, various enrichments can be detected and applied to the structured query to generate improved labels in the structured query. In some embodiments, the query preprocessing module can utilize large language models (LLMs) and/or natural language processing (NLPs) to generate a structured query from the user query. The structured query includes a variety of labels, depending on detected elements of the user query. For example, the structured query can include labels for subjects, locations, named entities, parts of speech, word classification and many more. In the first phase, the structured query with a first set of labels can be run through the knowledge graph 406, and/or queried against a variety of sources, such as the document storage 416, and if applicable/authorized against private indexes 418. When a root query is generated, the root query associated with the structured query can be searched against a vector embedding database/index 420. At the end of the first phase, a first set of results can be generated and stored in the results services 434.

In a second phase, happening in parallel to the first phase, or occurring after the first phase, the query planner module 410 can determine query pathways to further enrich the query in semantics, context, timelines, and/or other attributes. In this manner, a more featured or feature-rich query can be queried against the various sources, such as the knowledge graph 406. The query and/or the root query can be run against the knowledge graph 406 to hydrate the structured query. "Hydrating" the query refers to querying the knowledge graph 406 with previously determined query labels to generate improved query labels. An augmented or hydrated structured query with improved query labels can be searched in the query sources (e.g., document storage 416, private indexes 418), or more efficiently in the first set of results.

For example, a user query can be "Is there a build-up of tanks in the Eastern Ukraine?" The unstructured user query can be vague for a search system. For example, the text "tank" taken in isolation can refer to many types of tanks, such as propane tanks, irrigation tanks, and military, only one of which may be relevant to the intention of the user sending the query. In the first phase, the first set of results can be numerous, as the document storage 416 and private indexes 418 can be efficient in "recall," but not efficient in "precision," in matching the context of the query. In the second phase, the query can be hydrated with semantics, context, relationships, and timing information. The knowledge graph 406 can be used to enrich, hydrate, or augment the query. In the example above, the query includes a timeline of interest (e.g., "Is there . . . " indicating "current," or "now"), and a named entity ("Ukraine"). Furthermore, the knowledge graph 406 can include embeddings from data sources 426 related to an ongoing or current war in Ukraine. Consequently, the term "tank," in the query likely refers to "military tank." The hydrated query can be queried against the first set of results to return a more refined second set of results, better matching the context, semantics and the user intention behind the query. The second set of results can be stored in a results queue 436 and displayed to the user 102. In some embodiments, the hydrated query can also be queried against the previously queried sources, such as the document storage 416, the private indexes 418, and/or the vector embedding database/index 420.

Figure 5:
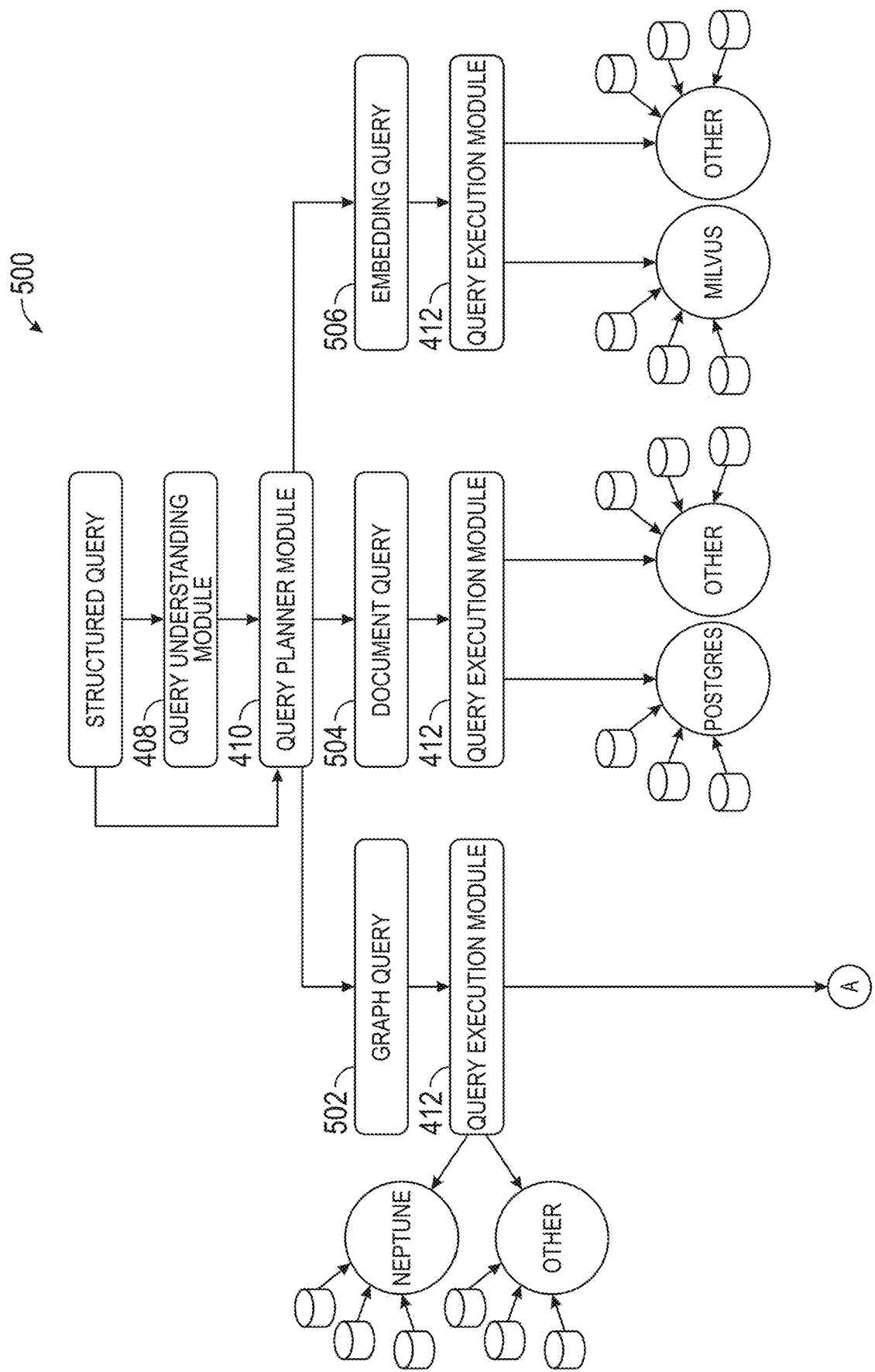
FIG. 5 illustrates a diagram of the components and operations of an example geospatial online search system in relation to generating query pathways and executing a search.
Figure 5:
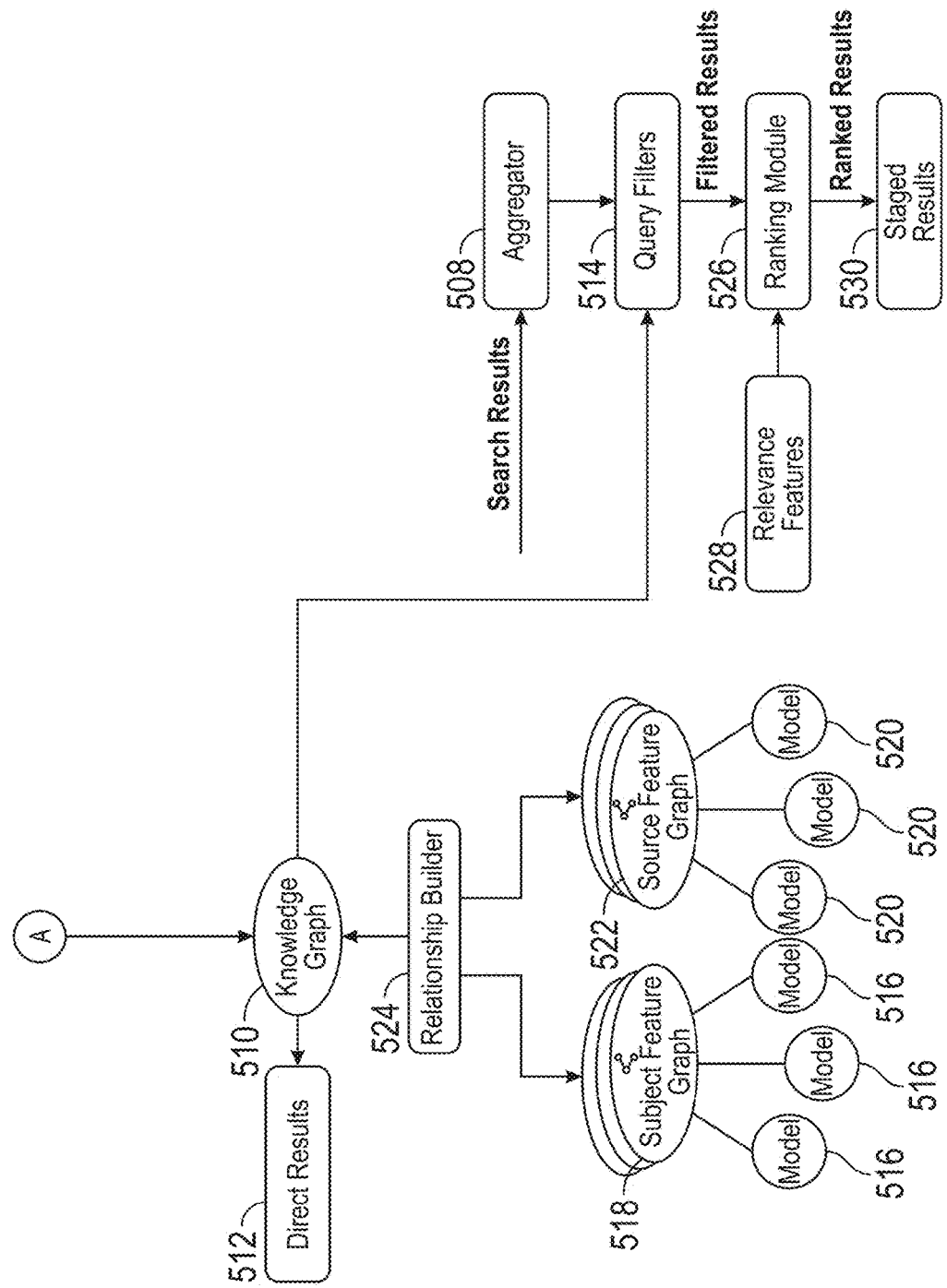

FIG. 5 illustrates a diagram 500 of the components and operations of the geospatial online search system 108 in relation to generating query pathways and executing a search. The query understanding module 408 receives a structured query and generates a root query. The query planner module 410 receives the root query and/or the structured query and generates applicable query pathways to enrich the structured query and/or the root query. The query execution module 412 sends and/or executes the query through the query pathways generated by the query planner module 410, where the structured query and/or the root query can be searched against indexes, or searched using database management systems, or searched using APIs. The root query can be searched in a vector-space embedding database and/or index, where a vector embedding of the root query is searched in the vector-space embedding database and/or index. Milvus is one example of a vector-space database that can be searched. The query pathways can be dynamic and expandable. For example, the query pathways can expand in the types of databases and the number of databases within each type which can be added to potential query pathways.

In some embodiments, the query planner module 410 determines one or more available query pathways into which the query execution module 412 can run a structured query and/or a root query. Each query pathway can terminate in a source of content, where the content might be accessible via an index database, a database management system, an API or via another intermediary. Each source may or may not return a match. The Query planner module 410 can generate one or more query codes compatible with the available query pathways. For example, when one or more knowledge graphs, one or more document databases, and one or more vector embedding databases are available, the query planner module 410 can generate query codes: graph query 502, document query 504 and embedding query 506, respectively. Each query code 502, 504, 506, when executed, runs the query through their respective query pathways. In this scenario, the graph query 502 is a graph traversal code, document query 504 is a database traversal code (e.g., a relational database traversal code), and the embedding query 506 is a vector embedding database traversal code. The query pathways and the query codes illustrated in FIG. 5 are provided as examples, and the query pathways and the query codes are not limited to the examples shown. An advantage of building query pathways and/or query codes, via the query planner 410 and/or the query execution module 412 is the scalability of expanding the sources which can be searched in relation to a query. The results of executing the query through a query pathway can be returned to the query planner module 410. The query planner module 410 can output the results of running each query through each query pathway to an aggregator 508. In some embodiments, the results of running a query against a backend database can be routed directly to the aggregator 508, bypassing the query planner module 410.

A knowledge graph 510 can generate a direct match or direct results 512 in response to executing the graph query 502. In some embodiments, the knowledge graph 510 can be the same as the knowledge graph 406. Direct results 512 can be routed to the query planner module 410 and/or the aggregator 508. The knowledge graph 510 can also be used to generate query filters 514. The query filters 514 are a set of filters that can be generated from the structured query and/or the root query in relation to the available sources of content for the query. The query filters 514 can depend on the domain, search field, and the overall attributes of the query, but also on the characteristics and attributes of the available sources of content in which the search for the query is to be performed. For example, in the field of geospatial search, a user query may be to search a subject of interest in relation to sensor data and databases that contain sensor data. For example, sensors that collect electrooptical (EO), or synthetic aperture radar (SAR) satellite imagery can be the relevant sources to the subjects of interest in a query in the field of geospatial search. The query filters 514 can be built based on encoding the relationships between the attributes of the query and the attributes and/or characteristics of the relevant sources within which the query can be searched.

As an example, various models 516 can build one or more subject feature graph 518, directed to the features of potential subjects of interest in user queries. The potential subjects of interest can be built based on prior queries, randomly generated, or otherwise generated and improved as users continue to submit queries to the geospatial online search system 108. As an example, one subject feature graph 518 can be directed to a type of military tank and its various physical features and/or other characteristics. Various models 520 can be used to build one or more source feature graphs 522, directed to attributes and characteristics of the available sources of content for searching a query. As an example, a source feature graph 522 can encode attributes and characteristics of a type of remote sensor generating imagery data for an image database. For example, a source feature graph 522 directed to an EO satellite imagery sensor and database, among encoding other information about an EO sensor and database, can encode that the EO satellite imagery is irrelevant or less relevant to low light conditions or conditions where the imaged area is obstructed (e.g., by clouds). Another source feature graph 522, among encoding other information about a SAR sensor and database, can encode that SAR imagery is relevant regardless of light conditions and/or obstructions. In some embodiments, the subject feature graphs 518 and source feature graphs 522 can be knowledge graphs. The subject feature graphs 518 and the source feature graphs 522 are provided as examples. More types of graphs encoding various attributes and characteristics of potential queries and search sources can also be added depending on the domain and search field.

A relationship builder 524 can traverse the subject feature graph 518 and the source feature graph 522 to detect and build relationships between these graphs, into the knowledge graph 510. In other words, the relationship builder 524 generates pairings and mappings between the query graphs (e.g., subject feature graph 518) and the source graphs (e.g., source feature graph 522). In some embodiments, the relationship builder 524 can be implemented with asynchronous analytics or other techniques. As an example, if a subject feature graph 518 encodes the physical dimension of a particular military tank, and a source feature graph 522 encodes the resolution of an EO sensor, the relationship builder 524 can create a pairing between the two as a structure in the knowledge graph 510. In this scenario, when a query related to the military tank is received, the knowledge graph 510 can return the EO sensor source as a relevant match for the query.

From the mappings between the query graphs and the source graphs encoded in the knowledge graph 510, the geospatial online search system 108 can generate the query filters 514. The query filters 514 can be applied to the aggregated results from the aggregator 508 to further reduce the size of the search results to a more relevant set of results. As an example, if the user query is about an object, the query filters 514 can generate filters that exclude content from sources that have sensor data whose resolutions would not be sufficient to adequately depict an image of the object of interest. Similarly, if a user query is received that indicates an interest in an object being observed at nighttime, the query filters 514 can apply to exclude EO satellite imagery of the object but include SAR satellite imagery of the object.

In some embodiments, the filtered results from applying the query filters 514 can be further refined with a ranking module 526. The ranking module 526 receives a set of relevance features 528 and assigns weights to the filtered results, based on the set of relevance features 528. The set of relevance features 528 can be generated from the labels in a structured query. As such the set of relevance features 528 can be different for different query fields. For example, for a geospatial search, where times, locations and imagery or object detection via satellite imagery are of interest, the set of relevance features 528 can directly relate to any labels in the structured query indicating any of the items of interest. The set of relevance features 528 can also be based on semantics or other "meaning" or "intention" generated from the query. As an example, a set of relevance features 528 for a geospatial search of an object and/or an object in an area in an indicated time, can include the degree of an image resolution, degree of an extent of area overlap, degree of closeness of timeline, and degree of confidence in an image being free of blockages (e.g., cloud blockage). In this scenario, the ranking module 526 applies the set of relevance features 528 to weight and rank higher the search results and/or images that have a higher degree of resolution, have a higher area of overlap between an area of regard (AOR) in the query and an area shown in the filtered results, are closer to the timeline of interest indicated in the query, and are free of blockages. The ranked results can be used to generate the staged results 530 and streamed to one or more user interface elements for the user 102 to observe.

Figure 6:
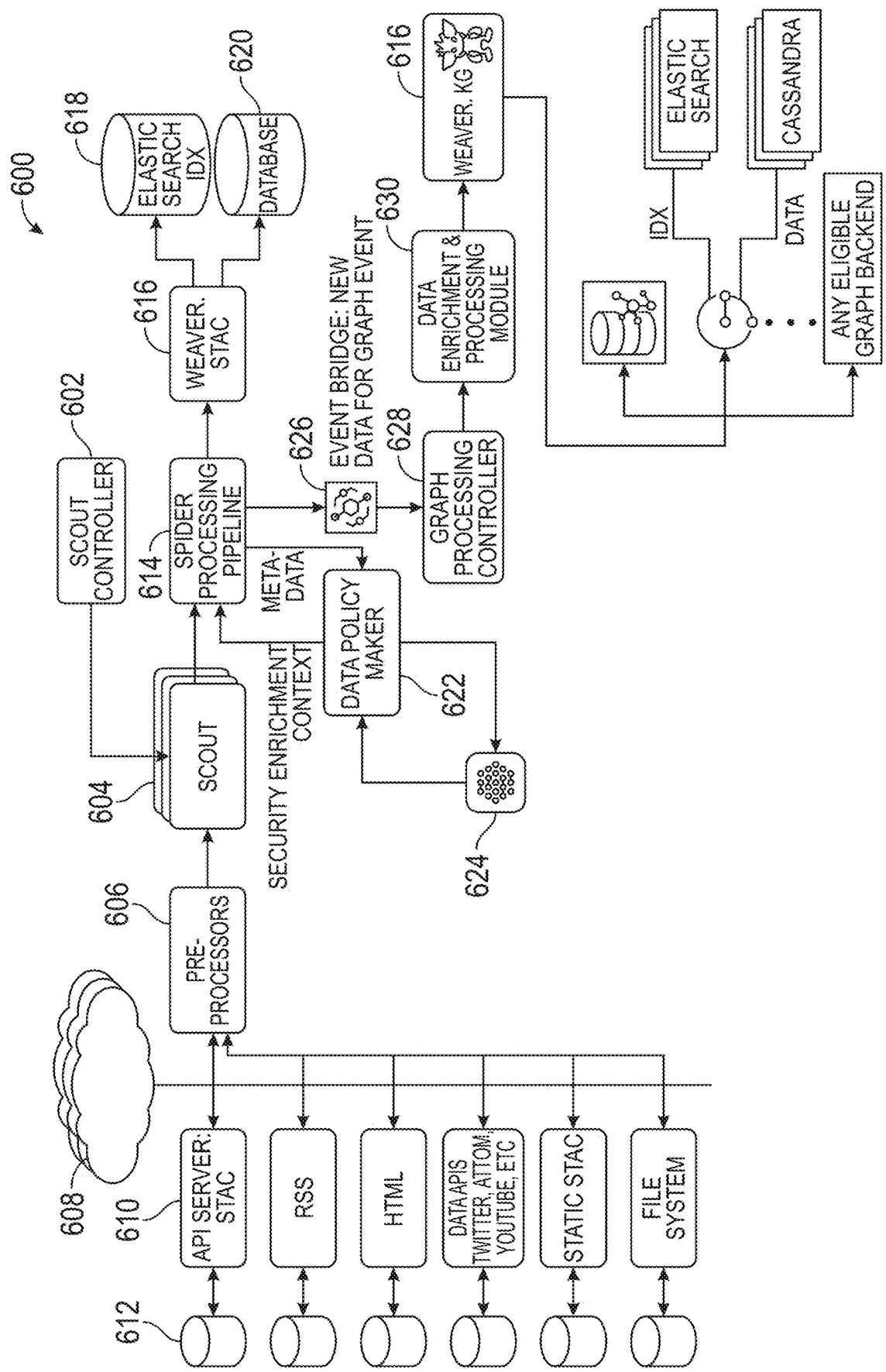
FIG. 6 illustrates a diagram of example components and processes of a spider engine and the enrichment and indexing pipeline.

FIG. 6 illustrates a diagram 600 of example components and processes of the spider engine 422 and the enrichment and indexing pipeline 424. A scout controller 602 communicates with one or more scouts 604 to fetch content from a variety of content sources 610 through one or more communication networks 608. The content sources 610 can include any data source and/or interface in public and/or private communication networks. Examples include STAC API servers, RSS, HTML, websites, data APIs provided by various platforms, including for example, Twitter®, Attom®, YouTube®, etc., and static STAC websites and file systems. The content sources 610 can in turn be an interface to content databases 612. The fetched content can be indexed, but not necessarily stored within the geospatial online search system 108, unless a user executes a "download" command. Preprocessors 606 can be built with natural language processing (NLPs) to perform detection of geospatial data and/or perform preliminary classification on the fetched content. Preliminary classification can include generating metadata for the fetched content to label type and format of the geospatial data present in the fetched content. Furthermore, the preprocessors 606 can generate metadata related to the frequency of the information updates for the fetched data. Example formats and classifications of the fetched content at the preprocessors 606 stage can include labeling whether the fetched content includes SAC-compliant data, open geospatial consortium-compliant data (e.g., Geotopes, etc.) and how frequently the data is updated. The frequency of the update can determine URL loading, crawl priorities and refresh rates for future operations of the scouts 602. In some embodiments, the spider engine can provide a URL linked to updated geospatial data from a content source with a high degree of confidence. The URL can be stored in an index along with enrichment metadata.

A spider processing pipeline 614 can generate an index for fetched content and/or add enrichments to the index using the knowledge graph 406. For example, the spider processing pipeline 614 can use an index builder 616 to build an index 618 for a database 620. The database can be a relational database, a vector-space embedding database, internal or external to the geospatial online search system 108.

The geospatial online search system 108 can also maintain privacy and/or security controls on the index 618 by applying security and/or privacy enrichments to the index 618. A data policy maker 622 can receive metadata of the index, use a privacy tool 624 to detect the security context of the indexed content and apply a security enrichment context label to the index. In some embodiments, the data policy maker 622 can interface with the knowledge graph 406 to determine a security context and/or privacy context of the indexed content. In other words, the knowledge graph 406, which has previously encoded or embedded security and/or privacy restrictions of the content can be used to enrich an index. The security-enriched metadata for an index can be associated with the index and saved alongside the index with additional enrichment metadata.

In some embodiments, the spider processing pipeline 614 can use an event-driven application builder 626 to further enrich the index. As an example, EventBridge® can be used to implement the application builder 626. In this scenario, the application builder 626 can rerun the fetched content to the knowledge graph 406 when the fetched content is updated or new data for an index is detected. A graph processing controller 628 can deploy or embed the updated fetched content in the knowledge graph 406. A data enrichment & processing module 630 can apply the enrichments extracted from the knowledge graph 406 to the corresponding index. The index builder 616 can build an updated index and store it in one or more corresponding databases.

User Interfaces

The result of a query can be used to generate various user interfaces, including for example, user interfaces that display geospatial data in a convenient or easy-to-digest format. For example, in some embodiments, the result of the query can be used to generate an "Imagery" section of a user interface, where the user 102 can cycle through images and/or video results, for example, maps, satellite views, drone imagery, etc. The "Imagery" section of the user interface can include a "Timeline" format of the imagery and video found as a result of running the query through the geospatial online search system 108, where any dates of interest indicated in the query can be used to build a timeline view of the imagery (e.g., a chronological view of the imagery based on the dates of interest indicated in the query).

Another user interface element or display section that can be generated, based on the result of the query, includes an "Analytics Reports" section to present applicable analytics reports that are found in relation to the user's query. A "Related News" section can present any news articles or URLs that are returned as a result of searching the query. The user interface can include a "Social Media" section to display any results found in relation to the query in various social media outlets. A "Things to Know" or similarly titled section in the user interface can outline general information in relation to the search query. The user interface can also include a sidebar displaying various data cards generated based on the result of running the query through the geospatial online search system 108. For example, an "Info Card" section can provide general information related to the query terms. An "Event Card" section can provide any events related to the query terms. A "Location Card" can show maps of a region or location determined from the context of the query or from any specific terms in the query. The user interface elements above can include text and/or graphics elements, such as thumbnails. Optionally some user interface elements can also include a URL for the user to access a source of the information outlined in the user interface element.

Figure 7:
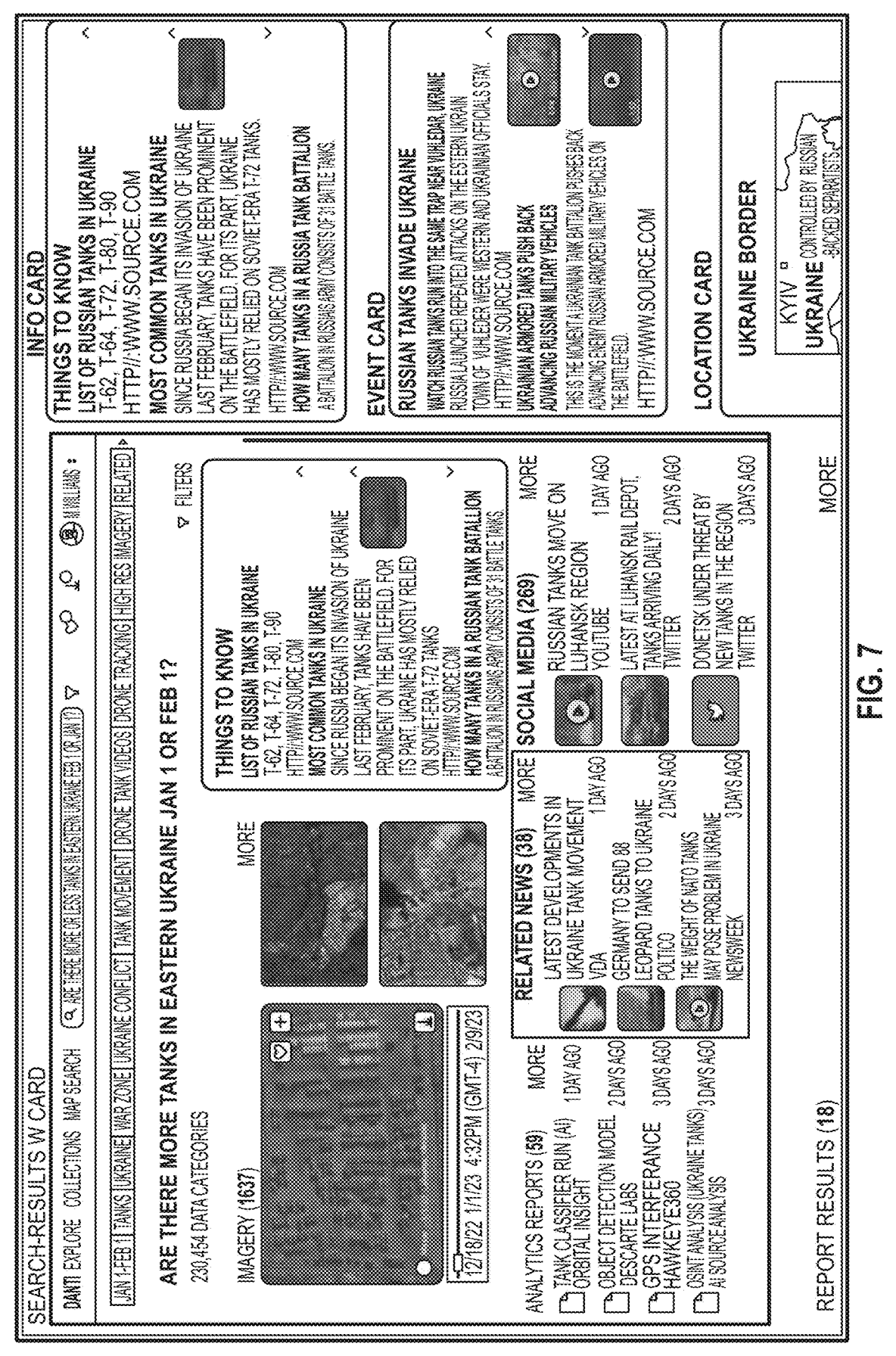

FIG. 7 illustrates an example of a user interface that can be generated based on the result of running a query through the geospatial online search system 108. For example, if the query is "are there more tanks in Eastern Ukraine Jan 1 or Feb 1?" The "ANALYTICSREPORTS" section can include links to sources that provide analytics reports on military tanks, sources that provide analytics reports on the output of an object detection model, sources that provide analytics reports for a global positioning system (GPS) coordinate, or for a GPS interface, or sources that provide open-source intelligence (OSINT) analytics. For the same query, the "RELATED NEWS" section can include news articles excerpts and/or links to content, discussing the query topics (e.g., military tanks in the Russo-Ukrainian conflict). For the same query, the "SOCIAL MEDIA" section can include links, text excerpts, images, video clips, graphics or other information discussing the query topics in social media outlets, such as YouTube®, Twitter®, and others. The "THINGS TO KNOW" section and the "INFO CARD" section can include general information on the topics specified or inherent in the query, and/or links to content and sources having information about the query topics. For the example query above, the "THINGS TO KNOW" section and the "INFO CARD" section can include information and/or links to content on Russian or Ukrainian military tanks, the overall tank numbers in each respective military, and similar information. The "EVENTS CARD" section can include links, text excerpts, graphics or media related to events surrounding or related to the query topics. For the example query above, the "EVENT CARD" section may include an excerpt, thumbnail and link to a video of Russian or Ukrainian tanks. The "LOCATION CARD" for the example query above can include a map of the Eastern Ukraine. The user interfaces outlined above are provided as examples only. The results of running a query through the geospatial online search system 108 can be presented in a variety of user interface elements or can be used to generate a variety of user interface elements. The links in the user interface elements discussed above can assume any format that allows accessing the linked content. Examples include hyperlinks, URLs, and API links.

Collections

The geospatial online search system 108 can provide the user 102, and/or an umbrella organization of the user 102, the ability to create collections, topics, and subtopics in order to organize queries and the result of running a query through the system. Collections can also include facilities for sharing the search projects and the results among multiple users. In some implementation of the geospatial online search system 108, "collections" can alternatively be termed "workspaces." While the system 108 might maintain an index or pointer to a source of content or document returned in the search, and not necessarily the raw content or document, the user 102 can, nonetheless, save the content or document in an allocated storage space in a collection. For example, a "Download" button can enable a user to save the content or document in a search result into a storage space allocated to the user.

The collections also allow the users to control the sharing of search projects and/or the information obtained from one or more search projects. The sharing can be with other internal or external individuals or systems that can perform further processing on the result of the search. The geospatial online search system 108 can maintain granular or document-level security mechanisms on the search result to control the sharing privileges and maintain the access attributes of the search result. In scenarios, where a user can share the search result with third-party vendors or analytics providers, the geospatial online search system 108 can maintain access credentials for the user to facilitate connection and transfer of the search results to the vendor.

The geospatial online search system 108 can also obtain the output of the third-party processing and use the output to generate user interface elements in the collections. Collections can enable the users to generate collections within a collection, topics, subtopics within a topic or additional directory or tree-like structures within a collection to organize their searching and handling of the search results within the user's allowed environments. Collections can take advantage of user interface elements, such as text, graphics, and thumbnails to facilitate navigation, organization, and management of the search results. Both static and dynamic collections can be used. For example, the users can subscribe to searches, where a query is periodically executed in the geospatial online search system 108 and the results are stored in a collection. Alternatively, the geospatial online search system 108 can automatically refresh a collection with updated data, as the new data becomes available. The user can be presented with an option whether to add an update to a user's collection or to deny or delete the update.

Figure 8:
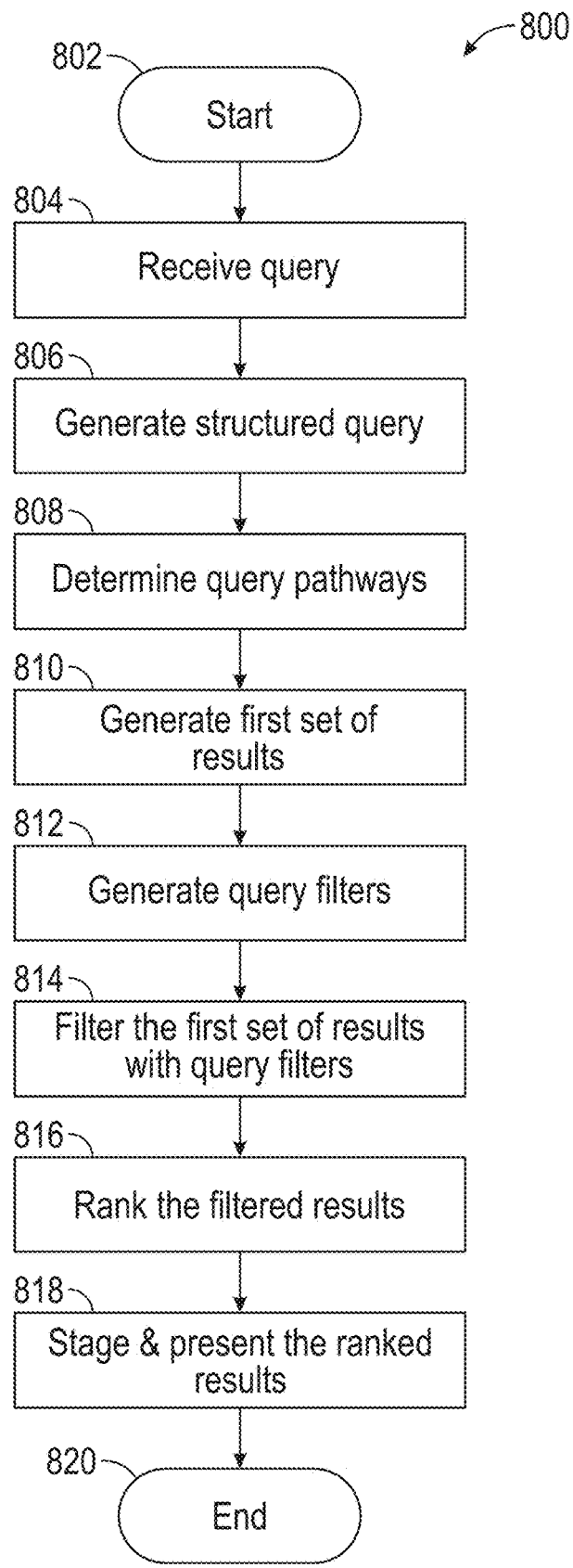
FIG. 8 illustrates a flowchart of an example method of the operation of a geospatial online search system.

FIG. 8 illustrates a flowchart of an example method 800 of the operation of the geospatial online search system 108. The method starts at step 802. At step 804, a user query is received. At step 806, a structured query is generated. In some embodiments, a root query can also be determined by matching a vector embedding of the query with vector embeddings of other queries. The structured query includes query labels. At step 808, one or more query pathways are determined, and query codes are generated. At step 810, the query codes are executed in the determined query pathways. At step 810, a first set of results are generated and routed to an aggregator. At step 812, one or more query filters are generated. The query filters can include domain type filters in relation to the available sources of content for searching the query. At step 814, the first set of results are filtered with query filters. At step 816, the filtered results are ranked in relation to a set of relevance features generated from the query labels obtained from the step 806. At step 818, the ranked results are staged and presented to the user. The method ends at step 820.

While the described embodiments can be implemented in general-purpose computer environments, they can also take advantage of special-purpose artificial intelligence hardware, such as graphics processing units (GPUs), tensor processing units (TPUs), and/or other processors optimized for handling artificial intelligence networks, models, and training datasets. In some embodiments, the AI hardware or other underlying hardware can be accessed via a cloud infrastructure.

The described embodiments advantageously improve the functioning and efficiency of computer systems, in particular, the functioning and efficiency of computer systems used for performing online search. For example, the described embodiments conserve the resources of an online computer search system by providing more efficient methods of searching, collecting, and processing a search query and generating user interfaces to present the results.

The described embodiments present solutions and improvements to technical problems in the field of online search, in particular geospatial online search. For example, traditional online search systems may return thousands of documents and links to a user query, where investment of substantial time and resources are needed to review the results and find the relatively few and on-point results relevant to the user query. The described embodiments enable a user to input a natural language search term and obtain few highly relevant results, saving the user time and resources.

Example Implementation Mechanism—Hardware Overview

Some embodiments are implemented by a computer system or a network of computer systems. A computer system may include a processor, a memory, and a non-transitory computer-readable medium. The memory and non-transitory medium may store instructions for performing methods, steps and techniques described herein.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be server computers, cloud computing computers, desktop computer systems, portable computer systems, handheld devices, networking devices or any other device that incorporates hard-wired and/or program logic to implement the techniques.

Figure 9:
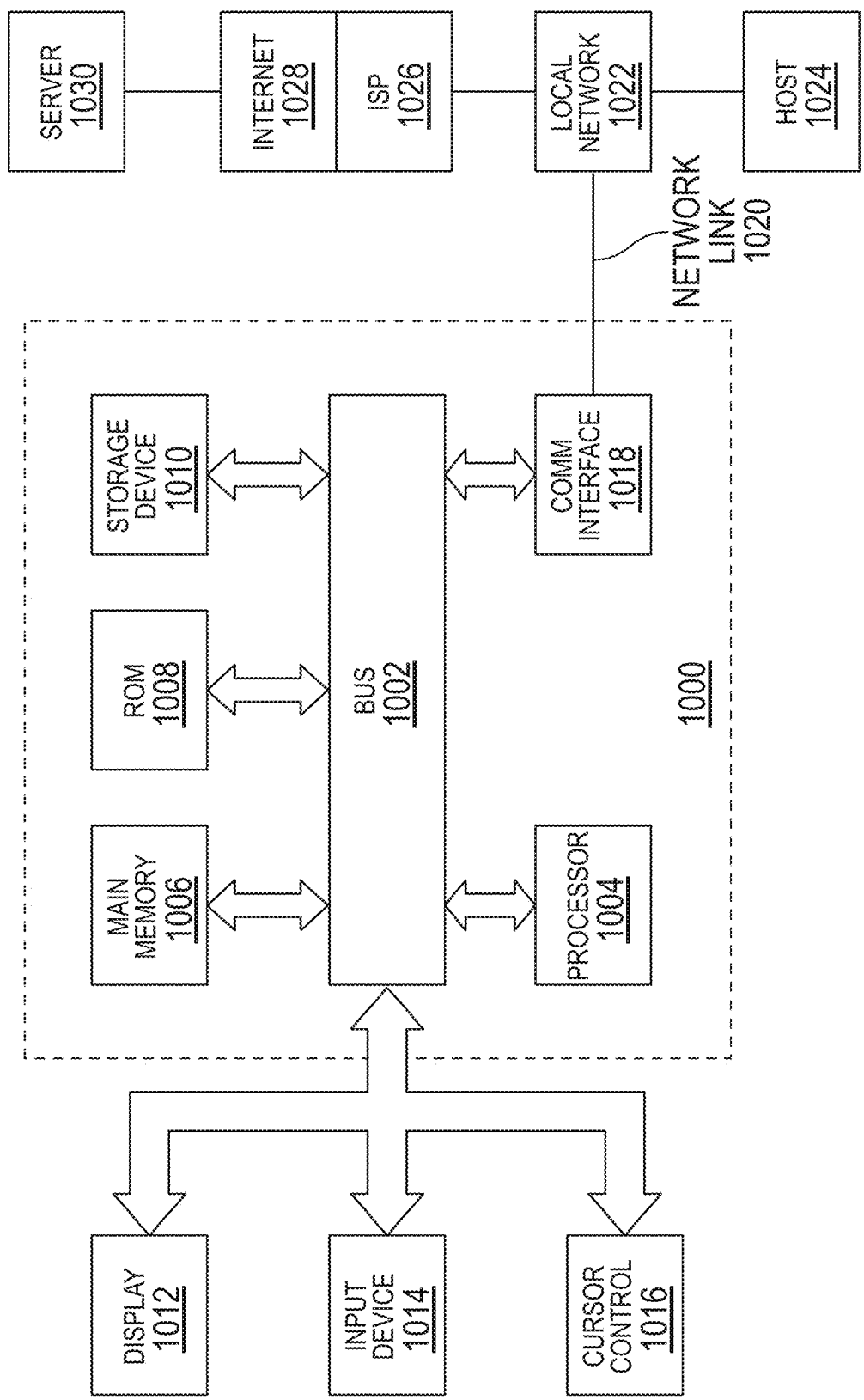
FIG. 9 illustrates an environment in which some embodiments may operate.

For example, FIG. 9 is a block diagram that illustrates a computer system 1000 upon which an embodiment of can be implemented. Computer system 1000 includes a bus 1002 or other communication mechanism for communicating information, and a hardware processor 1004 coupled with bus 1002 for processing information. Hardware processor 1004 may be, for example, special-purpose microprocessor optimized for handling audio and video streams generated, transmitted or received in video conferencing architectures.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid state disk is provided and coupled to bus 1002 for storing information and instructions.

Computer system 1000 may be coupled via bus 1002 to a display 1012, such as a cathode ray tube (CRT), liquid crystal display (LCD), organic light-emitting diode (OLED), or a touchscreen for displaying information to a computer user. An input device 1014, including alphanumeric and other keys (e.g., in a touch screen display) is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the user input device 1014 and/or the cursor control 1016 can be implemented in the display 1012 for example, via a touch-screen interface that serves as both output display and input device.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical, magnetic, and/or solid-state disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

EXAMPLES

It will be appreciated that the present disclosure may include any one and up to all of the following examples.

Example 1: A method comprising: receiving via an input device of a computing device, a query; generating a structured query comprising query labels; determining, based on the query labels of the structured query, one or more query pathways, each query pathway terminating in one or more content sources; generating compatible queries with each query pathway; running the compatible queries in each query pathway; aggregating results from running the query in each query pathway; generating a first set of results from the aggregated results; determining from a knowledge graph, one or more attributes of the received query; generating a set of filters, based on the attributes of the query; filtering the aggregated results based on the set of filters; ranking the filtered aggregated results based on weighting the filtered aggregated results, relative to a set of relevance features generated from the structured query; generating a second set of results, based on the ranked results; and generating one or more user interfaces, displaying the second set of results.

Example 2: The method of Example 1, further comprising: running the structured query in the knowledge graph; and generating improved labels of the structured query, wherein the determining the query pathways, generating compatible queries and running the compatible queries are based at least in part on the improved labels of the structured query.

Example 3: The method of some or all of Examples 1 and 2, wherein the sources comprise one or more of: one or more knowledge graphs and/or knowledge graph clients providing access to the one or more knowledge graphs; and one or more databases, comprising data, indexes, and vector embedding databases, and/or one or more database management systems and/or application programming interfaces (APIs) providing access to the one or more databases.

Example 4: The method of some or all of Examples 1-3, further comprising: generating vector embeddings of a plurality of queries; generating a vector embedding of the received query; generating a root query of the received query by finding matching and/or similar vector embeddings of the plurality of the queries and the received query, wherein generating compatible queries in each query pathway comprises generating compatible queries based at least in part on the root query.

Example 5: The method of some or all of Examples 1-4, wherein generating the structured query comprises utilizing one or more natural language processing (NLP) models and/or large language models (LLMs) to generate the query labels.

Example 6: The method of some or all of Examples 1-5, wherein the sources comprise an enriched index generated by: crawling content; generating an index pointing to the crawled content; using the knowledge graph, determining attributes of the crawled content, comprising one or more of semantics, contexts, relationships, timing of the crawled content; and appending metadata to the index, wherein the metadata comprises the determined attributes of the crawled content.

Example 7: The method of some or all of Examples 1-6, wherein the content is crawled from an application programming interface (API), a geospatial data provider API, a website, a really simple syndication (RSS) feed, a video provider and/or video metadata, a private and/or public file system.

Example 8: The method of some or all of Examples 1-7, wherein the content is crawled in a database in a private communication network.

Example 9: The method of some or all of Examples 1-8, wherein generating an enriched index further comprises: determining security context of the crawled content; augmenting the metadata with the determined security context; and receiving a security authorization attribute of a user, wherein determining the one or more query pathways is, at least in part, based on the augmented metadata and the security authorization of the user.

Example 10: The method of some or all of Examples 1-9, further comprising: determining an update timing of the content; and scheduling updating of the knowledge graph based on the determined update timing of the content.

Example 11: The method of some or all of Examples 1-10, further comprising: receiving authentication attributes of a user; and determining authorized sources for the user among the one or more content sources, wherein generating the compatible queries and/or running the compatible queries is at least in part based on the determined authorized sources for the user.

Example 12: The method of some or all of Examples 1-11, further comprising determining matching analytics data providers for the second set of results and displaying the matched providers along with the second set of results.

Example 13: The method of some or all of Examples 1-12, wherein the set of filters based on the attributes of the query comprise one or more of a domain of the query, timing encodings extracted from the query, and a timeline of interest in the query.

Example 14: The method of some or all of Examples 1-13, wherein the query comprises a geospatial query and the relevance features comprise one or more of a degree of resolution in an image in the filtered aggregated results, degree of an overlap in an area of interest expressed and/or inherent in the query and embedded in the query labels with area of coverage in an image in the filtered aggregated results, closeness of timing metadata of an item in the filtered aggregated results, and a semantics relevance score of an item in the filtered aggregated results.

Example 15: A non-transitory computer storage that stores executable program instructions that, when executed by one or more computing devices, configure the one or more computing devices to perform operations comprising: receiving via an input device of a computing device, a query; generating a structured query comprising query labels; determining, based on the query labels of the structured query, one or more query pathways, each query pathway terminating in one or more content sources; generating compatible queries with each query pathway; running the compatible queries in each query pathway; aggregating results from running the query in each query pathway; generating a first set of results from the aggregated results; determining from a knowledge graph, one or more attributes of the received query; generating a set of filters, based on the attributes of the query; filtering the aggregated results based on the set of filters; ranking the filtered aggregated results based on weighting the filtered aggregated results, relative to a set of relevance features generated from the structured query; generating a second set of results, based on the ranked results; and generating one or more user interfaces, displaying the second set of results.

Example 16: The non-transitory computer storage of Example 15, wherein the operations further comprise: running the structured query in the knowledge graph; and generating improved labels of the structured query, wherein the determining the query pathways, generating compatible queries and running the compatible queries are based at least in part on the improved labels of the structured query.

Example 17: The non-transitory computer storage of some or all of Examples 15 and 16, wherein the sources comprise one or more of: one or more knowledge graphs and/or knowledge graph clients providing access to the one or more knowledge graphs; one or more databases, comprising data, indexes, and vector embedding databases, and/or one or more database management systems and/or application programming interfaces (APIs) providing access to the one or more databases.

Example 18: The non-transitory computer storage of some or all of Examples 15-17, wherein the operations further comprise: generating vector embeddings of a plurality of queries; generating a vector embedding of the received query; generating a root query of the received query by finding matching and/or similar vector embeddings of the plurality of the queries and the received query, wherein generating compatible queries in each query pathway comprises generating compatible queries based at least in part on the root query.

Example 19: The non-transitory computer storage of some or all of Examples 15-18, wherein generating the structured query comprises utilizing one or more natural language processing (NLP) models and/or large language models (LLMs) to generate the query labels.

Example 20: The non-transitory computer storage of some or all of Examples 15-19, wherein the sources comprise an enriched index generated by: crawling content; generating an index pointing to the crawled content; using the knowledge graph, determining attributes of the crawled content, comprising one or more of semantics, contexts, relationships, timing of the crawled content; and appending metadata to the index, wherein the metadata comprises the determined attributes of the crawled content.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims.

What is claimed is:
1. A method comprising:
receiving via an input device of a computing device, a query;
generating a structured query comprising query labels;
determining, based on the query labels of the structured query, one or more query pathways, each query pathway terminating in one or more content sources;
generating compatible queries with each query pathway;
running the compatible queries in each query pathway;
aggregating results from running the query in each query pathway;
generating a first set of results from the aggregated results;
determining from a knowledge graph, one or more attributes of the received query;
generating a set of filters, based on the attributes of the query;
filtering the aggregated results based on the set of filters;
ranking the filtered aggregated results based on weighting the filtered aggregated results, relative to a set of relevance features generated from the structured query;
generating a second set of results, based on the ranked results; and
generating one or more user interfaces, displaying the second set of results.
2. The method of claim 1, further comprising:
running the structured query in the knowledge graph; and generating improved labels of the structured query, wherein the determining the query pathways, generating compatible queries and running the compatible queries are based at least in part on the improved labels of the structured query.

3. The method of claim 1, wherein the sources comprise one or more of:
one or more knowledge graphs and/or knowledge graph clients providing access to the one or more knowledge graphs; and
one or more databases, comprising data, indexes, and vector embedding databases, and/or one or more database management systems and/or application programming interfaces (APIs) providing access to the one or more databases.

4. The method of claim 1, further comprising:
generating vector embeddings of a plurality of queries;
generating a vector embedding of the received query;
generating a root query of the received query by finding matching and/or similar vector embeddings of the plurality of the queries and the received query,
wherein generating compatible queries in each query pathway comprises generating compatible queries based at least in part on the root query.

5. The method of claim 1, wherein generating the structured query comprises utilizing one or more natural language processing (NLP) models and/or large language models (LLMs) to generate the query labels.

6. The method of claim 1, wherein the sources comprise an enriched index generated by:
crawling content;
generating an index pointing to the crawled content;
using the knowledge graph, determining attributes of the crawled content, comprising one or more of semantics, contexts, relationships, timing of the crawled content; and
appending metadata to the index, wherein the metadata comprises the determined attributes of the crawled content.

7. The method of claim 6, wherein the content is crawled from an application programming interface (API), a geospatial data provider API, a website, a really simple syndication (RSS) feed, a video provider and/or video metadata, a private and/or public file system.

8. The method of claim 6, wherein the content is crawled in a database in a private communication network.

9. The method of claim 6, wherein generating an enriched index further comprises:
determining security context of the crawled content;
augmenting the metadata with the determined security context; and
receiving a security authorization attribute of a user, wherein determining the one or more query pathways is, at least in part, based on the augmented metadata and the security authorization of the user.

10. The method of claim 6, further comprising:
determining an update timing of the content; and
scheduling updating of the knowledge graph based on the determined update timing of the content.

11. The method of claim 1, further comprising:
receiving authentication attributes of a user; and
determining authorized sources for the user among the one or more content sources, wherein generating the compatible queries and/or running the compatible queries is at least in part based on the determined authorized sources for the user.

12. The method of claim 1, further comprising determining matching analytics data providers for the second set of results and displaying the matched providers along with the second set of results.

13. The method of claim 1, wherein the set of filters based on the attributes of the query comprise one or more of a domain of the query, timing encodings extracted from the query, and a timeline of interest in the query.

14. The method of claim 1, wherein the query comprises a geospatial query and the relevance features comprise one or more of a degree of resolution in an image in the filtered aggregated results, degree of an overlap in an area of interest expressed and/or inherent in the query and embedded in the query labels with area of coverage in an image in the filtered aggregated results, closeness of timing metadata of an item in the filtered aggregated results, and a semantics relevance score of an item in the filtered aggregated results.

15. A non-transitory computer storage that stores executable program instructions that, when executed by one or more computing devices, configure the one or more computing devices to perform operations comprising:
receiving via an input device of a computing device, a query;
generating a structured query comprising query labels;
determining, based on the query labels of the structured query, one or more query pathways, each query pathway terminating in one or more content sources;
generating compatible queries with each query pathway;
running the compatible queries in each query pathway;
aggregating results from running the query in each query pathway;
generating a first set of results from the aggregated results;
determining from a knowledge graph, one or more attributes of the received query;
generating a set of filters, based on the attributes of the query;
filtering the aggregated results based on the set of filters;
ranking the filtered aggregated results based on weighting the filtered aggregated results, relative to a set of relevance features generated from the structured query;
generating a second set of results, based on the ranked results; and
generating one or more user interfaces, displaying the second set of results.

16. The non-transitory computer storage of claim 15, wherein the operations further comprise:
running the structured query in the knowledge graph; and
generating improved labels of the structured query, wherein the determining the query pathways, generating compatible queries and running the compatible queries are based at least in part on the improved labels of the structured query.

17. The non-transitory computer storage of claim 15, wherein the sources comprise one or more of:
one or more knowledge graphs and/or knowledge graph clients providing access to the one or more knowledge graphs; and
one or more databases, comprising data, indexes, and vector embedding databases, and/or one or more database management systems and/or application programming interfaces (APIs) providing access to the one or more databases.

18. The non-transitory computer storage of claim 15, wherein the operations further comprise:
generating vector embeddings of a plurality of queries;
generating a vector embedding of the received query;

generating a root query of the received query by finding matching and/or similar vector embeddings of the plurality of the queries and the received query, wherein generating compatible queries in each query pathway comprises generating compatible queries based at least in part on the root query.

19. The non-transitory computer storage of claim 15, wherein generating the structured query comprises utilizing one or more natural language processing (NLP) models and/or large language models (LLMs) to generate the query labels.

20. The non-transitory computer storage of claim 15, wherein the sources comprise an enriched index generated by:

crawling content;

generating an index pointing to the crawled content;

using the knowledge graph, determining attributes of the crawled content, comprising one or more of semantics, contexts, relationships, timing of the crawled content; and appending metadata to the index, wherein the metadata comprises the determined attributes of the crawled content.

\* \* \* \* \*